United States Patent [19]

Brumlick et al.

[11] 4,181,743

[45] Jan. 1, 1980

[54] FOOD FLAVORINGS AND METHODS FOR PRODUCING SAME

[76] Inventors: George C. Brumlick, 155 Upper Mountain Ave., Montclair, N.J. 07042; Jerome H. Lemelson, 85 Rector St., Metuchen, N.J. 08840

[21] Appl. No.: 723,512

[22] Filed: Sep. 15, 1976

[51] Int. Cl.² ............... A23L 1/221; A23L 1/222
[52] U.S. Cl. ............... 426/241; 426/242; 426/533; 426/650; 426/655; 426/466; 426/804; 99/451; 99/516
[58] Field of Search ............... 426/49, 51, 60, 241, 426/242, 243, 533, 629, 632, 634, 649, 650, 655, 804, 466, 615

[56] References Cited

U.S. PATENT DOCUMENTS

| 1,174,248 | 3/1916 | Frericks | 426/51 |
| 2,518,441 | 8/1950 | Schaeppi et al. | 426/242 X |
| 3,681,090 | 8/1972 | Huth | 426/650 |

FOREIGN PATENT DOCUMENTS 37-1657  5/1962  Japan ............... 426/241

7102711  8/1971  Netherlands ............... 426/242

OTHER PUBLICATIONS

Sluder et al, "A Method for the Production of Dry Powdered Orange Juice", presented before the 6th Annual Food Conference, Buffalo, N.Y., Mar. 16, 1946.

*Primary Examiner*—Raymond N. Jones
*Assistant Examiner*—Esther M. Kepplinger

[57] ABSTRACT

New and improved food flavorings are provided including apparatus and methods for producing same. The flavorings are produced by extracting, concentrating and toasting a variety of organic materials including vegetable, fruit and root extracts or juices. In one form, the toasting procedure is carried out on an automatic continuous basis. In another form, the total manufacturing procedure is performed automatically and continuously. The resulting products, when added to various foods, render such foods salty tasting without the need for adding common salt (NaCl) to a variety of foods and food products. Such food flavorings may thus be used in salt free diets as well as conventional diets where new and improved tasty flavors are desired.

20 Claims, 8 Drawing Figures

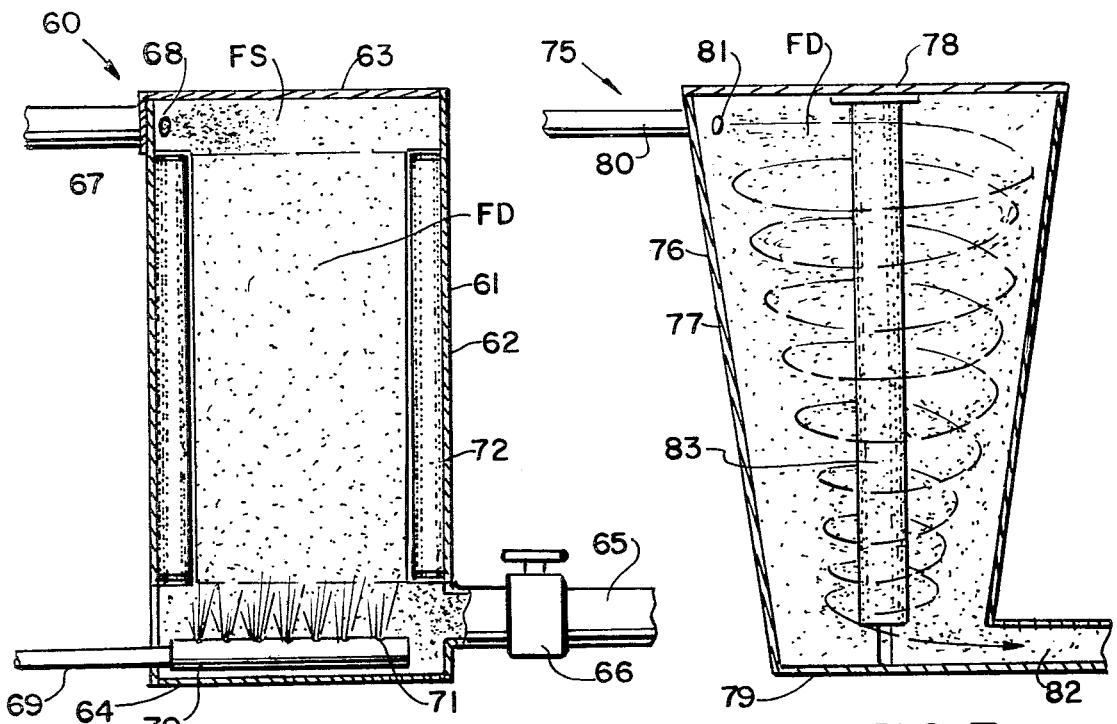
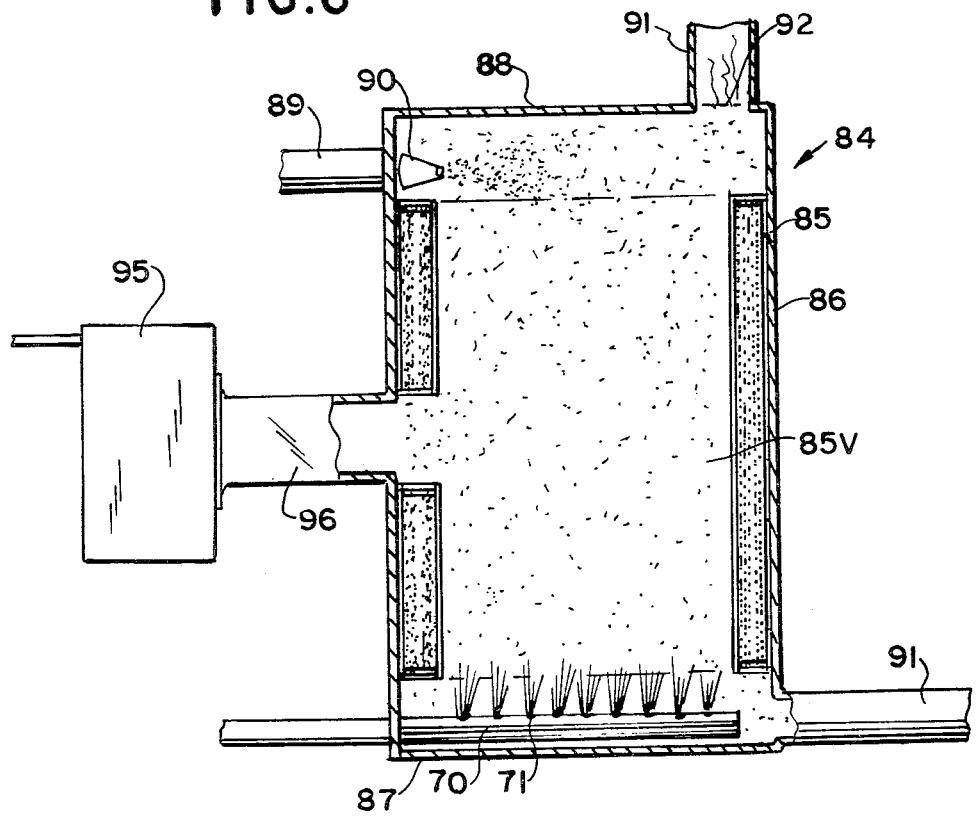

FOOD FLAVORINGS AND METHODS FOR PRODUCING SAME

SUMMARY OF THE INVENTION

This invention relates to new and improved food flavorings including a variety of tasty, palatable low sodium salt substitutes produced by toasting specially prepared organic materials and also to improved apparatus and methods for producing same.

Various low sodium salt substitutes have been used for the purpose of flavoring foods but met with limited success. Among such low sodium salt substitutes are monopotassium glutamate, dipotassium-5'-inosinate and dipotassium-5'-guanylate. However, the above-mentioned salt substitutes do not have a truly salty taste. Lithium chloride, potassium chloride and ammonium chloride have been used as salt substitutes but they either fail to satisfy their intended purposes or are too toxic in quantities to effect the sought after salty taste.

In accordance with the present invention, vegetable, fruit and root juices are rendered in conditions where they have a pronounced salty taste by toasting their concentrates. The preparations, which may be manufactured on an automatic or semi-automatic basis by means provided herein, retain the characteristically low sodium to potassium ratio found in many plant tissues.

Accordingly, it is a primary object of this invention to provide new and improved food flavorings together with apparatus and methods for producing same on an automatic or semi-automatic basis.

Another object is to provide new food flavorings which may be used as low sodium substitutes for common table salt.

Another object is to provide a number of new food flavorings derived from plant life which are quite unlike in taste from the taste of the plant life from which they are obtained.

Another object is to provide a new group of food flavorings which may be manufactured by properly processing a variety of different vegetables and fruits in a manner to yield clear extracts thereof, which extracts are properly treated while in a thin film condition to form solid matter in a flowable or fine particulate condition which may be used for flavoring a variety of foods or as a low sodium salt substitute which may be spread by hand or from a container across food about to be eaten or mixed with foods to enhance their taste.

Another object is to provide new and improved food flavorings which may be produced from a variety of common plant foods without difficulty and at low cost.

Another object is to provide new and improved tasty food flavorings having distinct salty tastes but which are low in sodium content. These flavorings may be solid, semisolid or liquid in their finished forms.

Another object is to provide a variety of new food flavorings which may be utilized to greatly enhance the palatability of a variety of different foods.

Another object is to provide a variety of new and improved food flavorings in combination with a number of common foods so as to form highly palatable and tasty new foods thereof.

Another object is to provide a new and improved apparatus and method for continuously processing a variety of materials with radiation directed at high intensity against a thin film of a liquid disposed on a flat surface.

Another object is to provide thin film reaction apparatus which may be operated continuously and automatically in a manner to utilize most if not substantially all of infra-red radiation generated to react on a quantity of matter.

Another object is to provide a reaction apparatus for reacting on particulate matter in a fluidized bed containing said particulate matter.

Another object is to provide a reaction apparatus employing both microwave energy and infra-red radiation to react on matter.

Another object is to provide a reaction apparatus employing vortex flow of particles and radiation means for reacting on such particles during their vortex flow.

The invention, its objects and advantages will be more fully understood from the following description when read in connection with the accompanying drawings in which:

In the drawings:

FIG. 6 is a side view with parts broken away for clarity of a reaction apparatus employing a fluiding bed for particles to be reacted on by radiation;

FIG. 7 is a side view with parts broken away for clarity of a particle reaction apparatus employing vortex flow; and FIG. 8 is a side view with parts broken away for clarity of a particle reaction apparatus employing microwave energy directed through a fluidized bed or flow of particles in a chamber.

Figure 1:
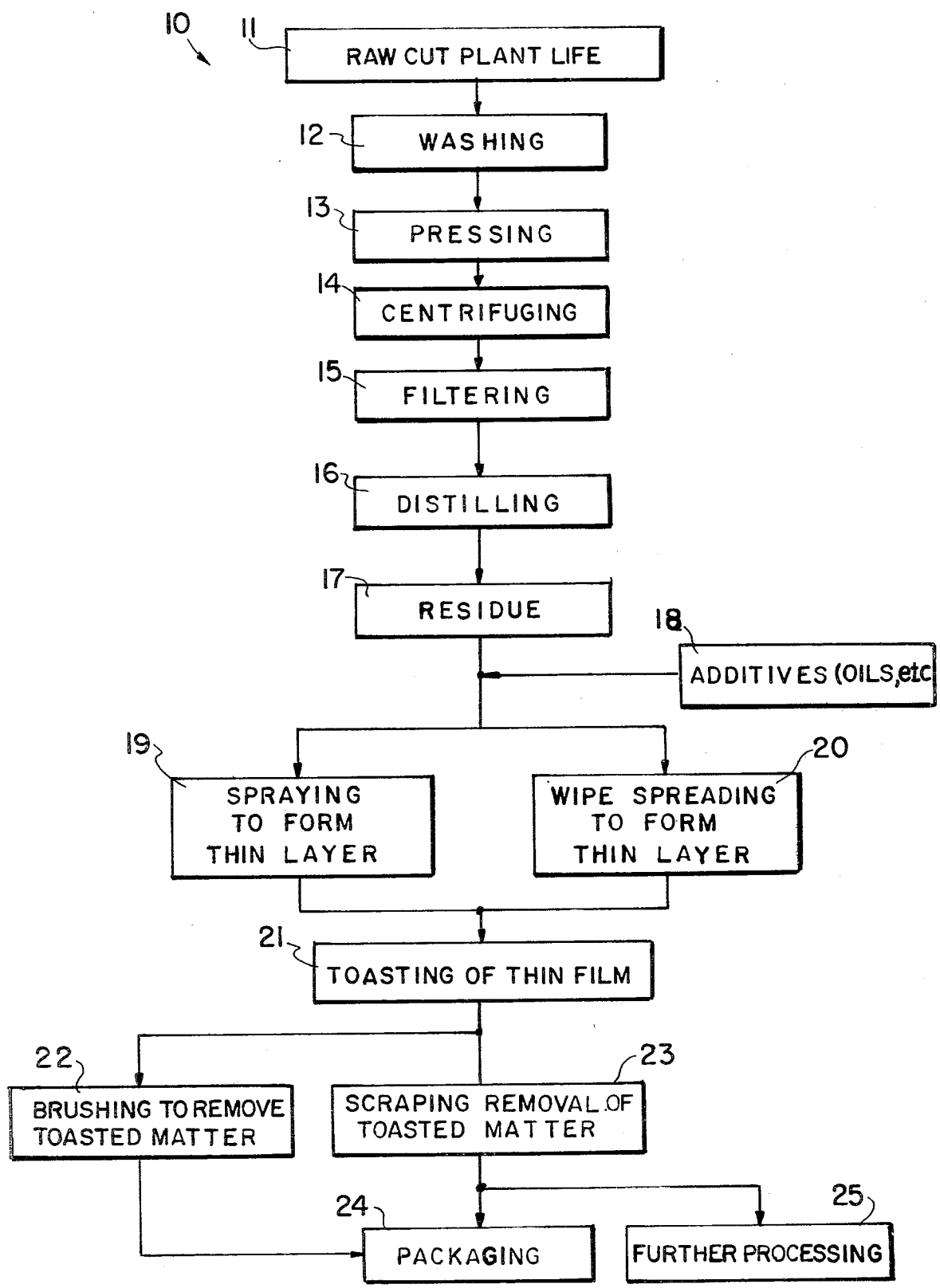
FIG. 1 is a schematic block diagram illustrating the process steps necessary to produce a number of food flavorings defined in the instant invention.

In FIG. 1 is shown a process for producing new and improved food flavorings from plant life. The system 10 defines a process in which a quantity of plant life 11 is first cleaned of residue including soil and other contamination by subjecting same to a washing operation 12 in any suitable kind of washing machine. From the washing step the plant life, which will be described in detail hereafter, is conveyed to a pressing machine wherein a pressing operation 13 presses liquid from the plant life together with fibers. The fibers and other forms of plant life are removed from the liquid by means of a centrifuging step 14 effected in a conventional centrifuge after which the separated liquid is passed through one or more filters in a filtering step 15 followed by evaporating or distilling operation 16 in which a substantial amount of the liquid or water is removed to provide a thick, viscous residue 17. Water may also be removed by means of microwave power. Following the filtering step 15 or the distilling step 16, the liquid may be directly sprayed or otherwise applied to the surface of a drum, belt conveyor, disc or other surface as indicated by step 19. The residue formed in step 17 may also be directly spread or otherwise applied as a thin layer to a drum, disc or belt as indicated by step 20. The surfaces to which the liquids are applied in steps 19 or 20 are then subjected to direct infrared radiation, preferably as they move or rotate past the radiation in step 21 which is sufficient to toast the material of the thin film applied to the belt, disc or drum to form a highly palatable flake or powder thereof which is removed from the belt, disc or drum by means of power rotated brushes defining step 22 or by means of a scraper or group of scrapers defining step 23. The output of the brush removal means defined by step 22 or the scraper defined by step 23 comprises a solid particulate material which may be directly packaged in a packaging step 24 or further processed as indicated by step 25.

Before detailing specific apparatus which may be utilized in a process such as that illustrated in FIG. 1, process steps for manufacturing the flavoring or low salt sodium substitutes of the instant invention may be generally defined as follows:

The following examples are presented for manufacturing the food flavorings of the instant invention on semi-automatic or automatic basis:

EXAMPLE 1

Pressed tomato juice is centrifuged and filtered to yield a clear light yellow solution; this filtrate is steam distilled and boiled down to a viscous residue. The residue is exposed to a source of infrared radiation in a 1 mm thick layer for periods ranging from five to forty-five minutes. Infrared lamps, and electrical resistance elements both clad and bare, are suitable as sources of infrared radiation; gas flames are also effective. Charing of the material that is exposed to the infrared radiation occurs if the temperature of the ambient air is allowed to rise above 400° F. This is prevented by the use of a thermoswitch which turns the source of the infrared radiation off and on when this temperature is exceeded. The tomato juice residue obtained in this manner has a pronounced salty taste and enhances strongly the taste satisfying properties of foods such as soups; gravies; boiled, baked and roasted and broiled meats; boiled and baked vegetables; baked goods prepared from flour; as well as salt free food products such as cheeses, cakes, cookies, and crackers and candies.

EXAMPLE 2

Tomato juice clarified and dehydrated as described in Example 1, is mixed with peanut oil in a ratio of ten parts tomato juice residue to one part of oil. The mixture is exposed to infrared radiation as described in Example 1. The irradiation residue appears to have an even more pronounced salty taste as compared to the materials obtained by irradiation without the presence of the oil. The taste enhancing power has been retained. Other oils and fats have been used to obtain materials similar in properties as obtained with peanut oil. Among these are olive oil, corn oil, Crisco, margarine and butter, suet, lard, and unsaturated vegetable oils.

EXAMPLE 3

Pressed tomato juice containing the red coloring matter is boiled down or freeze dried. A thin layer of the residue as described is exposed to the action of infrared radiation as described in Examples 1 and 2. The resulting materials have a strongly pronounced salty taste, accompanied by a flavor enhancing taste and a retained tomato flavor. The tomato flavor in the product obtained from the freeze dried residue is stronger than that of the product derived from the boiled down residue.

EXAMPLE 4

Onions are reduced to juice in a blender. The juice may be used filtered or unfiltered and is condensed by boiling or steam distillation. The residue is exposed as described in examples 1 and 2 to the action of infrared radiation in a 1 mm layer on the inside wall of a flash evaporator having a radiant resistance element on the axis of a rotating flask which exposes continually a thin layer to the radiant flux for periods ranging from five to fifty minutes. The obtained product has a pleasantly flavorful salty taste in which the amount of onion flavor is regulated by passing a stream of air through the flash evaporator or by drawing off the evaporating onion essential oils by applied suction.

EXAMPLE 5

Juice of unripe apples obtained by pressing is neutralized and reduced in acid content with potassium hydroxide or potassium carbonate to an acidity value ranging from pH 4 to pH 6, preferably. Higher acid values result in a product with a sour taste which may be valuable in certain cases as flavor enhances.—A basic product (pH higher than 7) result in products with an objectionable soapy taste.

The partially neutralized apple juice is exposed to infrared radiation as described in example 1 and 2 to the action of infrared radiation on the surface of a rotating cylindrical container (outer surface) in a thin layer. The resulting tan colored material has a pronounced salty taste and has a gum consistency. It is an excellent flavor enhancer substituting for salt and at the same time an excellent thickener for juices, soups, vegetable and fruit juices, gravies, puddings and the like. The product also aids in keeping solids in suspension.

EXAMPLE 6

Commercial molasses is mixed with cotton seed oil in a ratio of 20 to 1 respectively. The mixture is toasted as described in Examples 1 and 2 (i.e., exposed in a thin layer to the action of radiant heat). The residue has a salty taste superimposed on a sweet caramel-like taste.

EXAMPLE 7

Juice derived from fermented cabbage is partially neutralized (reduced in acid content) with potassium hydroxide or potassium phosphate up to a pH of about 6. The juice is steam distilled and boiled down to a residue with most water removed from the original starting material. The residue is toasted as described in Examples 1, 2, and/or 4. The obtained material is of low sodium content which is characteristic of the products of this class. It is salty tasting without an essential cabbage taste or flavor.

EXAMPLE 8

Pressed mushroom juice is toasted as described in Examples 1 and 2 after freeze drying. The resulting product has a pronounced salty taste accompanied by a sweet component and a pronounced mushroom flavor. Sodium and potassium organic and inorganic salts have been found to enhance the flavor of this product.

EXAMPLE 9

Pressed grass juice has been condensed by boiling, and toasted as described in Examples 1, 2 and 4. The product has a pronounced fresh and cool salty taste accompanied with a mild sweet component.

EXAMPLE 10

A juice is derived from grain such as wheat, barley, oats, rye, malt, alfalfa or other grain by fermenting or partially fermenting same, then pressing the fermented mass, followed by clarifying by centrifuging and filtering, if necessary, a thin film. The resulting residue is exposed to infrared radiation to evaporate the residue and toast the residue.

EXAMPLE 11

A juice is derived by pressing or otherwise processing partially fermented potatoes, the juice is clarified, as described or directly processed by toasting a thin film thereof as will be described hereafter to form a solid particulate material having a distinct salty flavor without the use of salt.

EXAMPLE 12

A liquid is derived by pressing uncooked soybeans or other beans, which liquid is filtered, distilled and boiled to form a viscous residue. The residue is treated as in Examples 1 and 2 and is toasted after distilling or freeze drying.

EXAMPLE 13

A liquid is derived by pressing potatoes. Such liquid is distilled to form a viscous residue and is processed as in Examples 1 and 2 to form a toasted food flavoring thereof.

EXAMPLE 14

Nuts, such as peanuts, walnuts, cashews or other form of nuts are pressed and/or extracted to form a liquid thereof which is processed as such or as a mixture with plant juice or extract as in Examples 1 and 2 to form a food flavoring which is unlike that of a conventional potato.

EXAMPLE 15

Bark, such as tree bark, is pressed, boiled with water or otherwise processed to form a residue thereof when the liquid water has evaporated. Further processing is effected as in Examples 1 and 2.

EXAMPLE 16

Roots such as the roots of various water plants, land plants and trees including licorice root, herbal roots and the like are pressed to derive their juices or extracts which are treated as described.

EXAMPLE 17

Sea kelp and sea weeds of various types may be pressed and the extracts or juices derived therefrom are processed as described herein.

In addition to the vegetables, grain, nuts and other form of vegetation and plant life described, it is noted that plant juices may be similarly processed as described, which are derived from such other vegetables as lettuce, scallions, beets, squash, peppers, pumpkins, yams, carrots, parsnip, parsley, celery and cucumbers. Fruits such as pears, plums, berries, melons, citrus fruits, peaches, pomegranates, mangoes, papayas, pineapples, grapes and the like may also be processed in the manner similar to that defined above in the processing of apples.

Other plant life which may be similarly processed by deriving juices therefrom as described and subjecting such juices to infrared radiation as described, include yeasts and sugar cane. Liquids or juices so derived may also be processed as so described, in a fermented state.

Figures 2, 3:
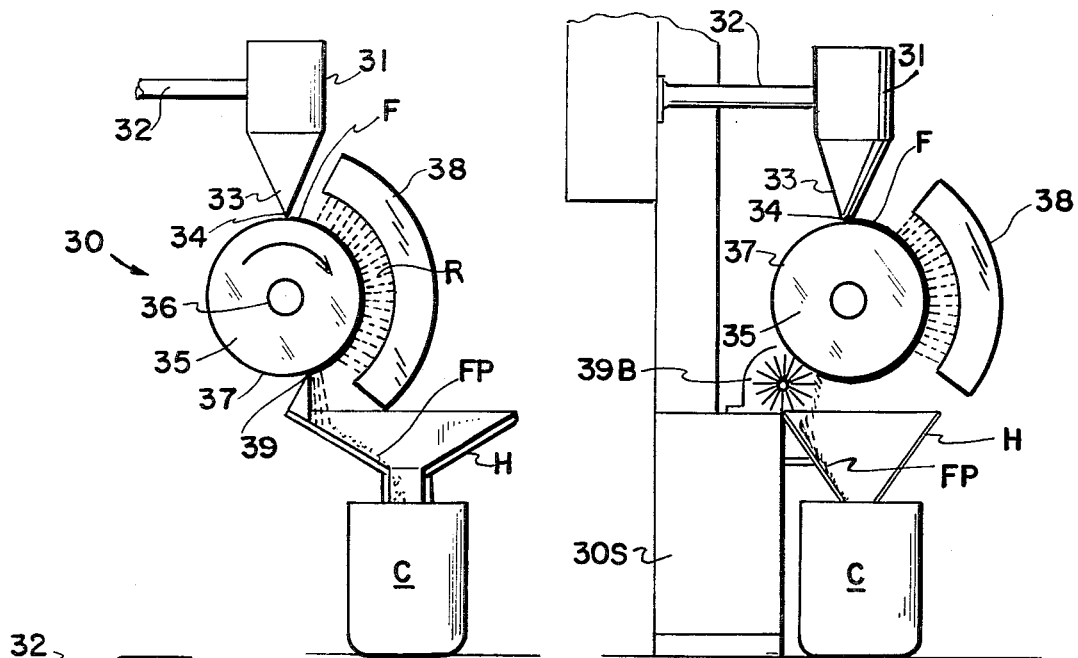
FIG. 2 is a side view of a first form of apparatus for continuously producing toasted food flavorings and employing a rotating drums.
FIG. 3 is a side view of a second form of apparatus including a rotating drum, for continuously producing toasted food flavorings.

FIG. 2 shows a first form of apparatus reactor 20 for continuously producing a particulate or flake-like material FP, such as a food flavoring material, by introducing an organic material in liquid form into a chamber 31 through an inlet pipe 32 and dispensing same from said chamber as a thin layer or film thereof onto the surface of a drum which is power rotated at constant speed. One of the liquids described herein, such as that which is derived from a multiplicity of steps in which plant life is pressed and centrifuged to provide a liquid containing organic matter, is introduced at constant rate into container 31 and flows downwardly therein into a tapering hopper section 33 thereof, the end of which contains a narrow opening 34 extending the width of the drum 35 and so configured as to cause the liquid dispensed through said opening to form a thin film across the entire cylindrical peripheral surface 37 of the drum. The drum 35 is power rotated on a central shaft 36 by means of a constant speed motor (not shown) is the clockwise direction as illustrated. As a result of the flow of organic material from the narrow opening 34 at the end of tapered section 33, the surface 37 of the drum contains a layer of easily toastable plant life material denoted F capable of being converted to a highly palatable food flavoring FP after being toasted against the drum surface. Disposed above and extending around almost half the cylindrical surface 37 of drum 35 downstream of the container 31 is a housing 38 containing one or more infra-red electrical heating elements which generate infra-red radiation R and direct said radiation against almost half of the cylindrical side wall of the drum and the organic material F disposed thereon as a thin layer or film so as to evaporate most if not all of the liquid from the organic material F leaving a solid residue on the surface of the drum which may be removed therefrom by means of a wedge or blade shaped scraping element 39, the upper edge of which engages surface 37 and removes the toasted material FP therefrom which flows to a hopper or funnel H and then downwardly into a container C. The drum 35 may be formed of stainless steel and may have its peripheral surface 37 in a highly polished or smooth condition or coated with a material such as polytetrafluorethylene to facilitate removal of flake or particulate material FP therefrom by means of the scraping action of the scraper 39. All of the components 31, 32, 38 and hopper H, as well as the bearings supporting the shaft 36 from drum 35 and the constant speed gear motor driving said drum may be supported on a common structural frame or mount. The flow of the liquid and the scraping of the layer F converting to product FP may be continuous or intermittent.

In FIG. 3, all of the components shown in FIG. 1 are provided supported by a common mount 30S with the exception that the scraper 39 has been replaced by a motor rotated circular brush 39B the bristles of which are preferably made of metal such as stainless steel and are adapted to rotate against the outer surface 37 of the drum along its entire length and to brush the toasted material therefrom which drops into a hopper H and flows therefrom into a container C.

Figure 4:
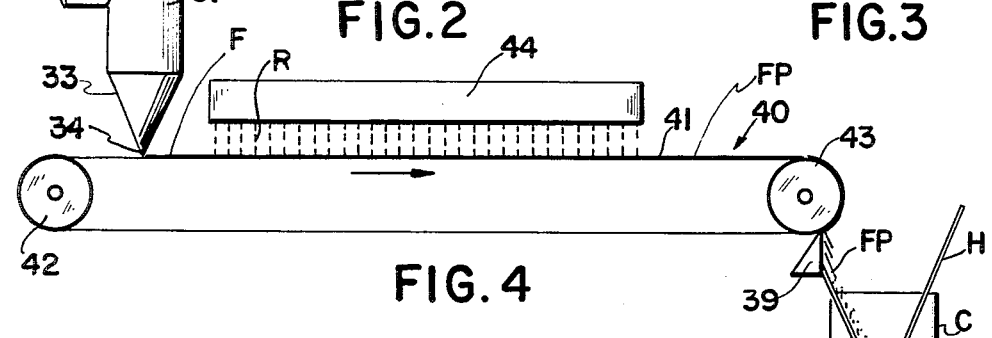
FIG. 4 is a third form of apparatus including an endless belt conveyor for continuously toasting food materials.

In FIG. 4 is shown an apparatus reactor for forming toasted flake or particulate material of the type described wherein the drums of FIGS. 2 and 3 are replaced by a conveyor 40 formed of an endless belt 41 such as a stainless steel sheet which is driven around two rollers or drums 42 and 43 by means of a constant speed gear motor (not shown) rotating one of said drums. Disposed immediately above the belt 41 near the drive roll 42 is a container 31 of the type described having a tapered lower end 32 with a narrow opening 33 disposed immediately above or against the upper surface of belt 41 for flowing or spreading the organic material supplied to the container 31 as a thin layer of film thereof, denoted F. The belt 41 passes beneath a long housing 44 containing a plurality of infra-red electrical heating elements generating radiation R along a substantial portion of the length of the belt 41. The radiation R serves to process and toast the material F disposed on the upper surface of belt 41 so that by the time the belt has reached drum 43, the material F has been converted to a solid food flavoring material FP disposed as a thin layer on the belt which may be removed therefrom by means of a scraper 39 extending across the width of the belt or a motor rotated brush of the type shown in FIG. 3. The flake or particulate material removed from the belt falls into a chute or hopper H disposed within a container C.

Figure 5:
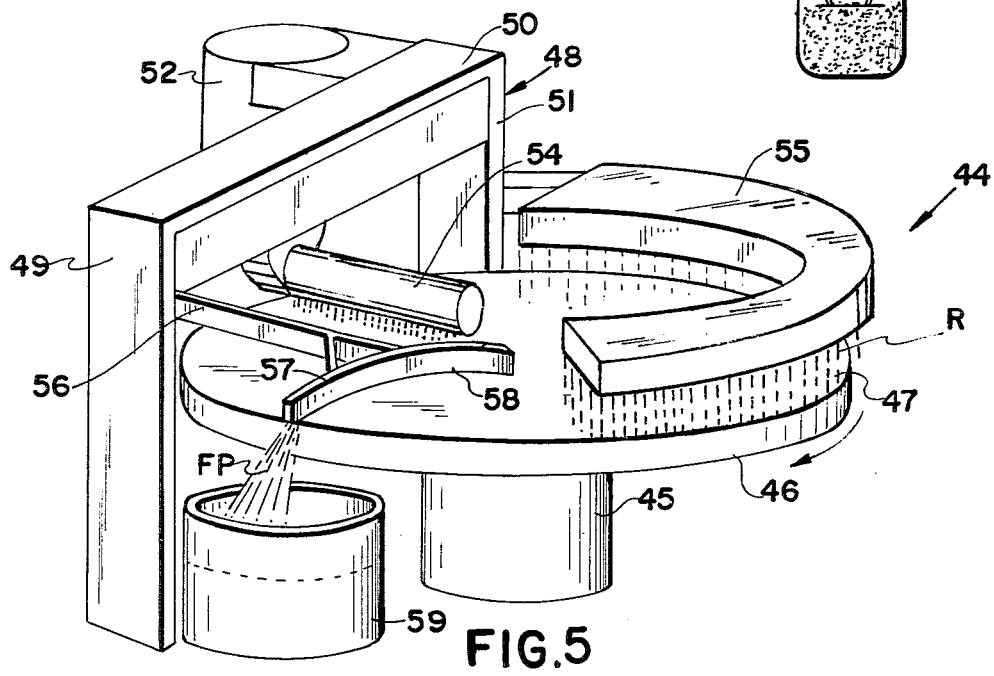
FIG. 5 is a fourth form of apparatus including a rotating turntable for continuously producing toasted flavoring materials.

In FIG. 5 is shown another form of processing apparatus 44 for liquid organic materials of the type described herein, which apparatus includes a power rotated turntable 46 having a substantially smooth, flat surface 47 and supported for constant speed power rotation on a base 45. An inverted U-shaped frame 48 is supported above and to one side of turntable 46 and supports thereon a container 52 for a liquid organic material of the type described which feeds, either by gravity or by means of a pump, said liquid to an elongated pipe 54 extending across half of the turntable and containing either a plurality of openings along its bottom or an elongated thin opening therealong for permitting liquid fed thereto from tank 52 to dribble or otherwise flow against the upper surface 47 to provide a thin film on the upper surface of the turntable. The film is preferably formed such that none of the material thereof will flow over the edge of turntable 46. As the turntable 46 rotates in a clockwise direction, the film of organic material disposed on its upper surface, is subjected to radiation R generated by infra-red electrical heaters disposed in a semi-circular housing 55 which is supported above the turntable by frame 48 and other means (not shown). The material flowed or spread onto the upper surface 47 from the duct or pipe 54 is toasted by the time it reaches the end of the housing 55 and is removed from the upper surface 47 by a scraping device 57 supported on an arm extending from frame 48 and having a lower sharp edge 58 engaging and scraping the upper surface 47 to about the center of rotation of the turntable 46. The material collected in the arcuate scraping device 57 flows therefrom outwardly to the peripheral edge of the turntable from which it flows into an open container 59 disposed therebeneath. The support 48 is composed of side uprights 49 and 51 joined by a horizontal beam or member 50 which completes the frame.

In the apparatus illustrated in FIGS. 2-5, a number of variations are noted including an electro-mechanical vibrating means for vibrating the scraping elements 39 and 57 of FIGS. 2 and 5 to facilitate removal of the toasted solid materials from the surfaces against which they are vibrated. It is also noted that a power rotated multi-filament circular brush element similar to 39B may be disposed above and have its filaments rotated against the upper surface 47 of turntable 46 to remove toasted solid material therefrom which may be conveyed by a controlled flow of air or liquid from the upper surface 47 to a container therefor, such as container 59 of FIG. 5, located at the peripheral edge of the turntable 46. Suction means may also be applied downstream of the infra-red heating elements and the scraping or brushing element to remove particulate or flake material formed by the scraping or brushing action, from the surface against which such material is formed.

A high velocity stream or streams of liquid, such as water, may also be directed against the solid toasted material formed on the surface of one of the drums, belt or turntable of FIGS. 2-5 and may be applied in such a manner as to remove and controllably flow the material FP to a container, screen or filter element for collection thereon from which the material, which may be flake or particulate, may be vibrationally removed and further processed, if necessary.

I. The spreading means of FIGS. 2-5 for the organic matter to be toasted may be replaced by one or more spray heads which are operable to spray said matter to form a thin film thereof on the drum, conveyor belt or disc-shaped turntable.

II. A vibrating means such as a motor operated vibrator or an electrical vibrator may be coupled to the end of the spreading means to assure more uniform distribution of the material spread onto the surface of the drum, belt or disc.

III. The scraping means illustrated in FIGS. 2-4 may also be vibrated to improve the continuous removal of toasted material from the surface of the drum, belt or disc.

IV. The surface of the drums, belt or disc illustrated in the apparatus of FIGS. 2-5 may be coated with a material such as polytetrafluorethylene or other suitable material to reduce the tendency of the toasted material to stick tenaciously thereto.

V. Other means may be provided for heating a thin film or finely divided quantity of organic material to toast same. For example, a fine mist or spray of such material may be generated by atomization and, while the aerosoled particles thereof are suspended in a chamber or falling through space, they may be subjected to the intense radiation of resistance heat elements, radiation generated by a beam, or other suitable radiation generating means for converting the particles to a physical form equivalent to the toasted forms described. A continuous process is possible in which the organic material is sprayed downwardly in a chamber and the particles thereof fall past one or more radiant energy generating and dispersing means such as microwave applicators, lasers, electron guns or otherwise generated radiation which is operable to convert the particles to a predetermined toasted material. The falling particles collect in a hopper or on a conveyor belt and are conveyed away from the chamber in which they are toasted. The process may be continuous or intermittent, and may employ automatic control means for controlling the variables thereof. To some extent, the time the particles or film are subjected to radiation as well as the intensity of such radiation will determine the flavor of the processed material. For example, if the boiling or toasting step to which the film or particles are subjected is relatively short, some of the original flavor of the organic plant life may be retained in the processed material. If toasting or film boiling is effected for a long enough period of time it is possible to eliminate all if not substantially all of the original flavor and produce a food flavoring, additive or salt substitute having a novel flavor or taste which is entirely different from the flavor or taste of the organic material from which it is derived.

Depending again on the degree of toasting or boiling of the thin film or particles, the final product may be in one of several forms including flake, fine particles or powder, thick paste or liquid. Toasted particles or flakes may be used per se or may be dissolved in or mixed with a variety of liquids including water, alcohols, oils including vegetable oils, esters and the like, prior to their direct use in cooking or their addition to various foods and food products during further processing thereof.

If in liquid or paste form, the food flavorings so derived may be further processed by freeze drying or the addition of preservative thereto, the crystallization thereof, etc.

In FIG. 6 is shown an apparatus 60 for operating on finely divided particulate material such as fine droplets of any of the described liquid food extracts derived from plant life or on particles formed by freeze drying such plant life and particlizing the resultant freeze dried material. The apparatus 60 comprises an elongated container 61 in the form of a tank having a cylindrical side wall 62, a top wall 63 and a bottom wall 64 with an outlet pipe 65 defined by a pipe welded to the lower end of the side wall and a valve 66 provided across the pipe for controlling the flow of processed particles and gas through the outlet. An inlet 67 extends through the upper end of the side wall 62 and terminates at a nozzle 68 located within the container which is utilized to spray or otherwise dispense liquid or solid particles fed from a supply thereof connected to the inlet line 67 into the upper end of the tank. Secured within and extending across the lower end of the tank 61 is a pipe 70 or a series of pipes containing a multitude of small holes 71 in the upper wall portions thereof through which holes air or fluidizing gas is flowed from an inlet 69 connected to a source of pressurized gas. The flow of gas upwardly from the pipe 70 is such as to create a fluidized bed of particles FD within the interior of the tank 61 which particles are reacted on by one or more devices located within the tank. Notation 72 refers to a cylindrical sleeve-like container secured to the wall 62 of tank 61 and retaining therein a plurality of infra-red heating elements for generating and directing infra-red energy toward the center of the tank. Such infrared energy reacts on the particles FD which are fluidized within the tank and serves to toast and convert the food particles to the food flavorings described above. Essentially, such reaction is similar to the thin film reactions occurring in the apparatus illustrated in FIGS. 2–5 since the particles of liquid or particulate material are finely divided, separated from each other and of film thickness in diameter.

From time to time or on a continuous basis, particles are drawn by fluid movement through the outlet pipe and valve 66 from the bottom end of the tank 61 which particles are processed as described by heating and toasting same with the infra-red energy directed toward the center of the tank 61 from the heating elements in the cylindrical container or liner 72.

In FIG. 7 is shown another apparatus 75 for effecting heating or toasting reactions on finely divided particulate material. The apparatus 75 includes a frusto-conically shaped container or housing 76 having its wider diameter at the upper end thereof enclosed by means of a top wall 78 and a bottom wall 79 at the lower end. An inlet line 80 terminates at an opening at the upper end of the side wall 77 and a nozzle 81 is disposed at the end of said inlet line which directs aerosoled or sprayed particles FD of plant life of the type described in a tangential direction such that a downwardly spiraling vortex flow of said gas and particles is generated within the tapered or conical chamber, which vortex flow continues until it reaches an outlet 82 near the bottom end of the container 76.

A cylindrical container 83 is centered within the conical container 76 and contains one or more infra-red resistance heating elements for generating and directing infra-red energy radially outwardly therefrom against the particles and gas which are moving in a vortex fashion around and downwardly of the infra-red container 83. The radiation serves to heat and toast the particles in the gas so that by the time they reach the lower end of the container 76 and flow out the outlet 82 thereof, which is located near the bottom wall 79 of the container, said particles will have been heated or toasted a predetermined amount to provide them in a desired physical condition, said condition being such as that described above, for the purpose described.

It is noted that, due to the swirling vortex action generated within the conically shaped housing 77, the particles in the gas are maintained away from the wall of the radiant heater container 83 so that they will not deposit thereon and become burned during the operation of the apparatus 75.

In FIG. 8 is shown yet another form of apparatus for reacting on particulate material, such as the food flavoring materials described above. The apparatus 84 includes an elongated container 85 having a circumscribing cylindrical or otherwise shaped side wall 86, a bottom wall 87 and a top wall 88. An inlet line 89 is connected to the side wall 86 near the upper end thereof and terminates at a nozzle 90 which directs gas and particles tangentially of the container 87 to cause a vortex-type flow of gas and particles around and downwardly through the container 86 past a plurality of infra-red radiation generators or heaters 93 which are disposed around and adjacent to the side wall of the container 85.

An opening is provided in the side wall 86 of the chamber 85 and connected thereto across said opening is a conduit 96 which serves as a wave guide for microwave energy generated by a microwave energy generator, such as a magnetron tube located, within a housing 95 at the end of wave guide 96, the configurations of the housings 85 and the wave guide 96 are such that suitable microwave energy generated by a magnetron tube or other means located within housing 95 will be properly directed into the volume 85V defined by the interior of the container 85 and will serve to rapidly heat the particulate material introduced through nozzle 90 and flowed downwardly in a spiral-like fashion through the volume 85V such that the water vapor located within the particles will form steam and will flow upwardly in volume 85V to an exit line 91 which is secured to an opening in the upper wall 88. A stainless steel wire mesh 92 extends across the exit line 91 to filter the particulate material from the escaping steam.

It is noted that in the embodiment illustrated in FIG. 8, gas fluidizing means 70 may be provided at the lower end of chamber 85 to fluidize particles of food introduced through nozzle 90 and to maintain them in a fluidized state for a sufficient period of time to allow the effects of the infra-red heaters 93 and the microwaves generated by the magnetron located within housing 95 so as to form a toasted particulate material which is constantly drawn off the bottom end of the volume 85 V through the exit line 92.

We claim:

1. A low sodium food flavoring produced by the process comprising extracting plant juice from plants, condensing said extracted juice, and toasting said condensate with radiation of an intensity and for a period of time effective to alter the original flavor of the starting plant material.

2. A food flavoring in accordance with claim 1 in which said plant juice is derived from vegetable plant life.

3. A food flavoring in accordance with claim 1 in which said plant juice is derived from fruit plant life.

4. A food flavoring in accordance with claim 1 in which said plant juice is derived from plant life selected from the group consisting of yeasts and mushrooms.

5. A food flavoring in accordance with claim 2 in which said plant juice is derived from vegetables selected from the group consisting of lettuce, tomatoes, onions, scallions, beets, squash, peppers, pumpkins, yams, potatoes, carrots, parsnip, parsley, celery, cucumbers and cabbage.

6. A food flavoring in accordance with claim 1 wherein said plant juice is derived from a fruit selected from the group consisting of apples, pears, plums, berries, melons, citrus fruits, peaches, pomegranates, mangoes, papayas, pineapples, grapes and the like.

7. A food flavoring in accordance with claim 1 wherein said plant juice is derived from sugar cane.

8. A food flavoring in accordance with claim 2 in which said plant juice is derived from at least one grass.

9. A food flavoring in accordance with claim 1 in which said plant juice is derived from a fermented plant material.

10. A method of producing a low sodium salt substitute comprising the steps of extracting juice from plants, condensing said extracted juice and toasting said condensate with electromagnetic radiation of an intensity and for a period of time effective to alter the original flavor of the starting plant material.

11. A method in accordance with claim 10 in which the electromagnetic radiation is infrared radiation.

12. A method in accordance with claim 10 in which said toasting step comprises subjecting a thin layer of said plant juice to electromagnetic radiation to toast same.

13. A method in accordance with claim 10 in which said juice formed of plant components is derived from vegetable plant life components.

14. A method in accordance with claim 10 in which said juice of plant life components is derived from fruit plant life.

15. A method in accordance with claim 10 in which said juice of plant life components is derived from fermented plant life components.

16. A method in accordance with claim 10 in which said electromagnetic radiation is infrared and is supplemented by additional heating of said juice.

17. A method in accordance with claim 11 in which said infrared electromagnetic radiation toasting step is used in conjunction with a treatment with microwave electromagnetic radiation.

18. A method in accordance with claim 10 in which the toasting step is effected by continuously feeding said juice to a continuously moving surface to form a thin film thereof and disposing a source of electromagnetic infrared radiation adjacent to said surface to permit the surface and the film thereon to move continuously therepast in a manner to cause evaporation of the liquid from the film and to form a thin layer solid, said method including removing said solid from said surface downstream of said infrared radiation.

19. A method in accordance with claim 18 in which the removal step is effected by scraping said solid from said surface.

20. A method in accordance with claim 10 in which the electromagnetic radiation is microwave radiation.

* * * * *